United States Patent
Alley (10) Patent No.: US 7,823,756 B2
(45) Date of Patent: Nov. 2, 2010

(54) ALTERNATIVE FLEXIBLE GATE RESTRICTORS

(76) Inventor: Kenneth A. Alley, 19406 Via Del Mar, Apt. # 108, Tampa, FL (US) 33647

(*) Notice: Subject to any disclaimer, the term of this patent is extended or adjusted under 35 U.S.C. 154(b) by 0 days.

(21) Appl. No.: 11/701,855

(22) Filed: Feb. 1, 2007

(65) Prior Publication Data

US 2007/0164057 A1 Jul. 19, 2007

Related U.S. Application Data

(63) Continuation-in-part of application No. 10/953,007, filed on Sep. 28, 2004, now abandoned.

(60) Provisional application No. 60/763,953, filed on Feb. 1, 2006, provisional application No. 60/506,568, filed on Sep. 29, 2003.

(51) Int. Cl.
 *B67D 5/28* (2006.01)
(52) U.S. Cl. .............................. 222/528; 215/900; 215/6
(58) Field of Classification Search ................. 222/509, 222/527–530, 533–537, 511, 498, 499; 220/502, 220/509; 215/900, 6, 45, 52, 63, 212–217; 206/222
See application file for complete search history.

(56) References Cited

U.S. PATENT DOCUMENTS

| 2,101,310 | A | | 12/1937 | Callaghan |
| 2,285,227 | A | | 6/1942 | Pemu |
| 2,957,501 | A | | 10/1960 | Holmes |
| 2,990,979 | A | | 7/1961 | Harrison et al. |
| 3,323,694 | A | * | 6/1967 | Stevens, Jr. ................. 222/498 |
| 3,616,961 | A | * | 11/1971 | Mallorca ..................... 220/269 |
| 4,572,412 | A | * | 2/1986 | Brach et al. ................. 222/527 |
| 4,690,375 | A | | 9/1987 | Vorhis |
| 5,275,298 | A | * | 1/1994 | Holley et al. ............... 215/11.4 |
| 5,419,445 | A | * | 5/1995 | Kaesemeyer ............... 215/11.1 |
| 5,474,734 | A | | 12/1995 | Akazawa et al. |
| 5,611,776 | A | * | 3/1997 | Simmons et al. ............. 604/65 |
| 5,624,062 | A | | 4/1997 | Pedersen et al. |
| 5,647,516 | A | * | 7/1997 | Young et al. ................ 222/529 |
| 5,950,819 | A | * | 9/1999 | Sellars ....................... 206/221 |
| 2006/0196895 | A1 | * | 9/2006 | Trejo .......................... 222/528 |

* cited by examiner

*Primary Examiner*—Lien T Ngo
(74) *Attorney, Agent, or Firm*—Mark A. Garzia, Esquire; Law Offices of Mark A. Garzia, P.C.

(57) ABSTRACT

A container using a flexible membrane integrated into the throat or egress passageway of a bottle. The membrane forms a portion of the passageway's sidewall. The membrane flexes inward when an external force is applied causing the inner walls of the passageway to frictionally mate together and restrict the flow of a fluid or non-fluid through the passageway and flexes outward when the force is removed allowing the inner walls of the passageway to move away from one another and allow the flow of the fluid through the passageway.

5 Claims, 6 Drawing Sheets

Fig 18A
Stacking load
180

Fig 18 E
Cross section of sealing surface

ALTERNATIVE FLEXIBLE GATE RESTRICTORS

CROSS REFERENCE TO RELATED APPLICATIONS

The present application claims the benefits under 35 U.S.C. § 119(e) of U.S. Provisional Application No. 60/763,953 filed Feb. 1, 2006, titled FLEXIBLE GATE RESTRICTOR MEMBRANE TECHNOLOGY WITH ALTERNATIVE GEOMETRIES, in the name of Kenneth A. Alley.

Also, the present application is a continuation-in-part of, and claims the benefit under all relevant U.S. statutes, including 35 U.S.C. §120, to U.S. application Ser. No. 10/953,007 filed Sep. 28, 2004, titled FLEXIBLE GATE RESTRICTOR MEMBRANE APPARATUS, in the name of Kenneth A. Alley, which application in turn claims the benefits under 35 U.S.C. §119(e) of U.S. Provisional Application No. 60/506,568, filed Sep. 29, 2003, titled FLEXIBLE GATE RESTRICTOR CONTAINER SYSTEM in the name of Kenneth A. Alley.

U.S. application Ser. No. 10/953,007 filed Sep. 28, 2004, and U.S. Provisional Application No. 60/763,953 filed Feb. 1, 2006, are hereby incorporated by reference as if fully set forth herein.

FIELD OF THE INVENTION

The present invention relates generally to plastic bottles and more specifically to apparatus integrated into the neck of a bottle for controlling fluid flow from the bottle.

BACKGROUND OF THE INVENTION

Numerous fluid containers require careful control of the fluid flow as they are dispensed into their desired reservoir. Additionally, control of oil (anti-freeze, hydrocarbons, chemicals, etc.) flowing from oil containers into internal combustion (gasoline) engines are a very common problem. There are many automotive, marine and chemical products that may pose serious safety hazards, environmental hazards and property damage if the fluid spills during dispensing. Funnels help provide means to carefully dispense the product. However, when more fluid is poured into the funnel then the throat of the funnel can handle, the fluid will overflow the funnel. Also, residue remains on the funnel and it becomes a hazard as well.

Accordingly, there was a need for a device capable of restricting flow out of water bottles, oil containers or other fluid and non-fluid containers when they are inverted which would not interfere with normal flow of the fluid (or non-fluid) out of the container after the container was securely positioned where intended. Furthermore, such a flow restriction device was required to have characteristics that permitted control of the outlet port restrictor. Additionally, a flow restriction device for use specifically with oil or other fluid containers is needed that can be adapted for use with existing receiving means, for example engines, reservoirs etc.

In order to be useful the restriction device was required to involve minimal expense for manufacturing, filling and would ideally be designed to work within current filling, manufacturing (extrusion blow molding), materials and assembly infrastructures.

Alternative systems have been developed to address this problem with bottles used with water coolers and other fluid containers. For example, U.S. Pat. No. 4,741,448 and U.S. Pat. No. 5,996,860, both issued to Kenneth A. Alley, provided solutions to these problems. In the systems disclosed in the '448 patent and the '860 patent, a momentary gate was provided for fluid containers that effectively restricted fluid flow through an upper container port as the container was inverted. The momentary gate was incorporated into a fluid container having a tapered fluid port (sometimes referred to as the neck) at an upper end through which fluid passed to fill or empty the container, and means within the bottle for momentarily restricting fluid flow out of the port when the bottle was inverted.

The restricting means disclosed in these prior art patents by Alley had a construction such that if the bottle was filled with fluid in an upright position, the fluid was permitted free passage through the port until the bottle was substantially full. The momentary gate was made separately from the bottle. These momentary gate restrictors were inserted into the bottle after the bottle was made. According, the cost of the momentary gate restrictor was added to the final cost of the product container.

There are also other specialized two-piece closures to control access to the contents of a container, for instance typical shampoo closures. Most of these require more than one component and are therefore cost prohibitive if the same technology is applied to the case of motor oil packaging. They also all require a specialized closure.

The ideal solution for cost competitive product containers (oil, etc.) would be one that would involve no additional components. The following invention provides a one piece container system with a built-in flexible gate restrictor. The present invention will also work with standard closures. The flexible gate restrictor may be built directly into the container, thus not requiring a special closure (i.e., cap).

U.S. patent application Ser. No. 10/953,007 to Kenneth A. Alley discloses a basic design of a Flexible Gate Membrane; the present invention includes alternative designs, geometries and configurations.

SUMMARY OF THE INVENTION

The present invention is a specialized container using a novel flexible gate system preferably incorporated into the throat (or ingress/egress passageway) of a container for restricting (or controlling) fluid flow (or access) when the container is inverted.

More specifically, this invention relates to a flexible gate system adapted to a container for restricting fluid flow through an upper container port when the container is inverted and or for controlling general access to the contents of a fluidic or non-fluidic container by means of flexing (activating) the gate mechanism. The flexible gate membrane may also provide means for tamper evidence, without the need for a tamper evident closure. The adaptation of the flexible gate restrictor membrane provides the means to isolate container's contents with or without the additional cost of a closure. It also provides the means to control the interior dimensions of a container for isolating individual chambers within a single container system or for communicating with a specialized closure mechanisms (such as; a closure with a sealed reservoir adapted that communicates with the interior walls of the container as the flexible membrane of the container is manipulated). Another application of the Flexible Gate Membrane would be a communication between the outer walls of the flexible membrane and the outer skirt of a closure, thereby creating a child resistant closure. There are numerous applications for the Flexible Gate Restrictor Membrane Technology.

The present invention consists of a fluid reservoir/container and a specialized flexible gate restrictor built into the container. An important embodiment is when the container is an oil bottle having an elongated bottle neck that is used for ingress and egress to the bottle. The flexible gate restrictor is designed to have a collapsible diameter/geometry with respect to the bottle neck's exit port. The flexible gate restrictor provides the means to occlude the container's exit port.

When the flexible gate restrictor is activated (i.e., forced, compressed or squeezed inward), the bottleneck exit port will be occluded. When the flexible gate restrictor is released or decompressed by removing the inward force the bottleneck exit port is opened to allow fluid to flow out of the bottle.

It should also be noted that the present invention may include specialized closures (i.e., caps) that communicate with the flexible gate membrane of a container. Some examples of these closure systems will be described in FIGS. 14, 15 and 16. The specialized closures are designed to open the passage way between the exit port of the container and the reservoir of the container. The closure systems may also include their own reservoirs (FIG. 15) to include lyophilization capabilities as well as a gate mechanism; these will include applications such as applicators, baby bottles and numerous other applications where contents maybe separated during manufacturing and mixed prior to use). Also, the Flexible gate membrane could be used to replace the standard closure of many containers and or replace the tamper evident features on closures.

Unlike other oil containers the present invention would not require the use of a funnel and will provide an economical, simple and safe means to invert the container to pour out its contents without spilling its contents. The present invention also provides restricting means that are built into the container during its molding and/or manufacturing process minimizing manufacturing expenses. The present invention becomes a closed loop living hinge thus, no extra components are necessary. A flexible gate restrictor could be designed to always be in either an open or closed position thus requiring an additional and/or constant force to open or close the flexible gate restrictor (container). The flexible gate may be designed to have numerous geometries and may be designed to open and close by numerous means such as a push-pull tab or by bending the container's neck to activate the membrane; in this particular case, the flexible gate restrictor will be open in its static position and would require a constant force to close the restrictor gate.

Although the discussion above focuses on fluid containers, the present invention could be used for food and beverage containers, lyophilizing container systems, prescription containers, child resistant containers and many other applications where a flexible gate restrictor could be adapted to everyday fluid or non-fluidic containers. All of these containers may also use the flexible gate restrictor for the sole purposes of a tamper evident membrane thus, eliminating the need for more expensive tamper evident closures. The Flexible Gate Restrictor could also be adapted to containers, as a splash proof or spill guard to provide an additional safety feature. These containers could be designed to remain closed unless a constant force is applied. (For example, if a child removed the cap from a container, the child could not get access to the contents without applying a constant outward pressure on the flexible gate membrane.)

There are several containers on the market that require special child-resistant closures (CRC). The present invention could be an alternative to the CRC closure whereby, the present invention provides a child resistant container. A container with the Flexible Gate Restrictor System adapted could be designed to work with either a standard closure or by incorporating a CRC feature within the Flexible Gate membrane to create a child resistant container without the need for a separate cap or closure (CRC). Another application of the Flexible Gate Membrane would be a communication between the outer or inner walls of the flexible membrane and the outer or inner skirt of a modified closure, thereby creating a child resistant closure system utilizing the flexible membrane of the container (described in FIG. 13).

Although the invention description focuses on a fluidic container, thus controlling the flow as a container is inverted; there are numerous container applications that would greatly benefit from its function and cost of existing containers that are used for everyday food and beverage packaging, drug and pharmaceutical packaging and chemical packaging. Some of the applications will be described herein within the drawings to provide the larger scope of this novel invention and technology. These will include a single piece lyophilization baby bottle, standard lyophilization containers, water/beverage/food containers, unit dose applicators with a specialized closure (with built-in reservoir or gate) that communicates with the containers flexible membrane restrictor, etc. to name a few.

BRIEF DESCRIPTION OF THE DRAWINGS

The foregoing summary, as well as the following detailed description may be better understood when read in conjunction with the accompanying drawings, which are incorporated in and form a part of the specification. The drawings serve to explain the principles of the invention and illustrate embodiments of the present invention that are preferred at the time the application was filed. It should be understood, however, that the invention is not limited to the precise arrangements and instrumentalities shown.

In the drawings:

FIG. 13 also includes child resistant features.

FIG. 16 is another alternative embodiment of a Flexible Gate Restrictor Membrane in accordance with the present invention adapted to a container that communicates with a specialized closure system. In this particular example, a Lyophization Beverage or Applicator is shown. The Flex Gate Restrictor Membrane has a collapsible feature on at least one side of the container's neck. The collapsible feature of the container will open a seal (or break) on a specialized closure, thus mixing the sealed contents of the closure with the contents of the container and simultaneously, opens a passageway to the exit port of the container. This particular closure has a lever arm that is designed to communicate with the collapsible feature of a container. It should be noted that different top covers could be adapted such as a baby bottle nipple, applicator head or sport top to name a few.

FIGS. 18, 18A, 18B, 18C, 18D and 18E represent different views of another preferred embodiment of the flexible gate restrictor which could be adapted to a wide variety of containers. This particular design/embodiment does not include the folds along its vertical as described in FIG. 1.

DETAILED DESCRIPTION OF THE PREFERRED EMBODIMENT

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

Figure 1:
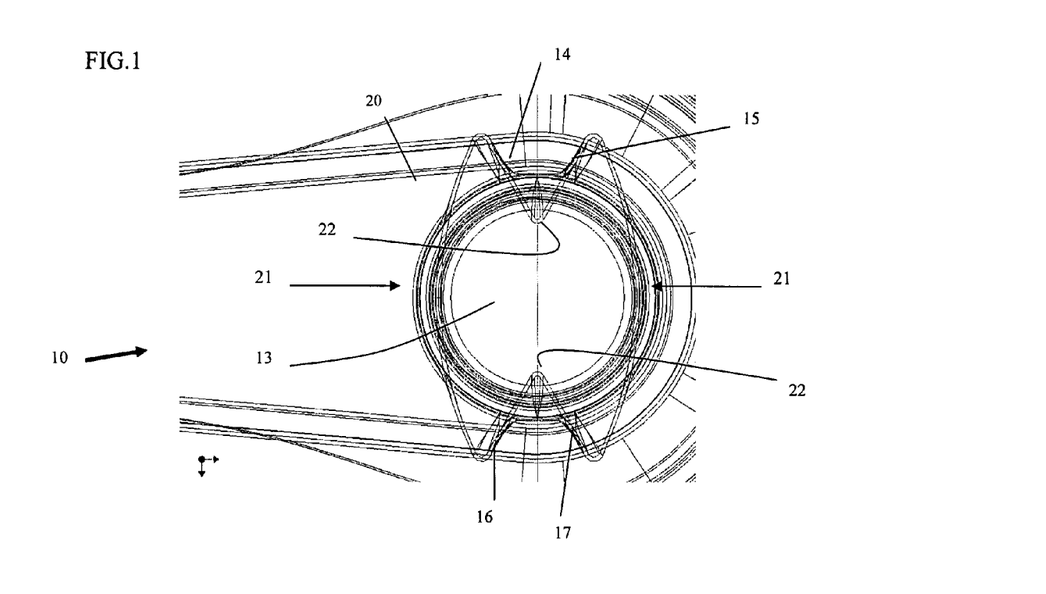
FIG. 1 is a partial top view of a novel fluid container showing a Flexible Gate Restrictor in accordance with the present invention.

Referring now to FIG. 1, a container 10 incorporating a Flexible Gate Restrictor 20 for controlling fluid flow when the container is inverted as shown. A common container on which the present technology is intended to be used is the typical one-quart bottle in which oil is sold. According, FIG. 1 is a top view of such an oil bottle. The typical oil bottle has an elongated neck that forms an upper container port through which the fluid enters the bottle during filling or through which the fluid egresses when the bottle is emptied. The flexible gate restrictor system 20 is formed into the neck of the container 10 for restricting fluid flow during the manufacturing process of the container; this would reduce the costs of utilizing this technology.

Figure 2:
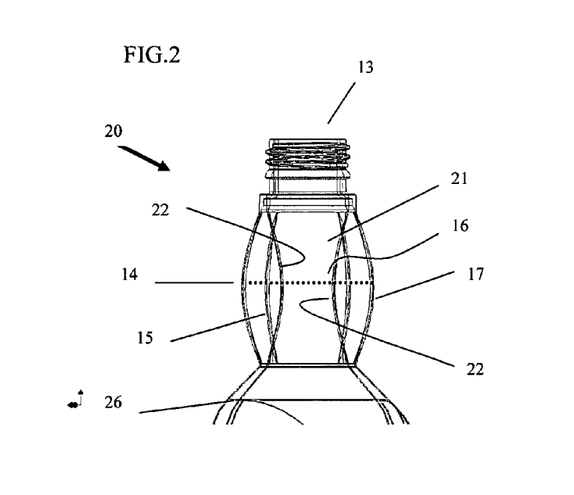
FIG. 2 is a partial perspective front view of the Flexible Gate Restrictor shown in FIG. 1.

As illustrated in FIG. 2, container 10 would typically be molded with the flexible gate system 20 in the open position shown in FIG. 1 (this is referred to as the "normally open" version since the passageway is open when no external force is applied to the flexible restrictor membrane). The membrane 21 of flexible gate restrictor 20 does not interfere (in the open position) with the filling of container 10. In the static position (i.e., no external pressure is being applied) entry/exit port 13 has an uninterrupted passage way to reservoir 11.

Flexible gate restrictor 20 includes vertical folds 14, 15, 16 and 17 that will pivot around points 22 when inward pressure is applied to flexible membrane 21.

In the static position, entry/exit port 13 remains open (i.e., normally open). Upon some type of manipulation, the flexible restrictor gate either partially or completely closes the exit port 13. It should be apparent to one skilled in the art after reading this disclosure that the flexible gate technology disclosed herein functions as a low-cost but highly effective valve in plastic containers. Similar to the function of a typical metal valve that can partially or completely close the flow of a fluid in a pipe, the flexible gate restrictor disclosed herein controls the flow of fluid exiting a container.

Figure 3:
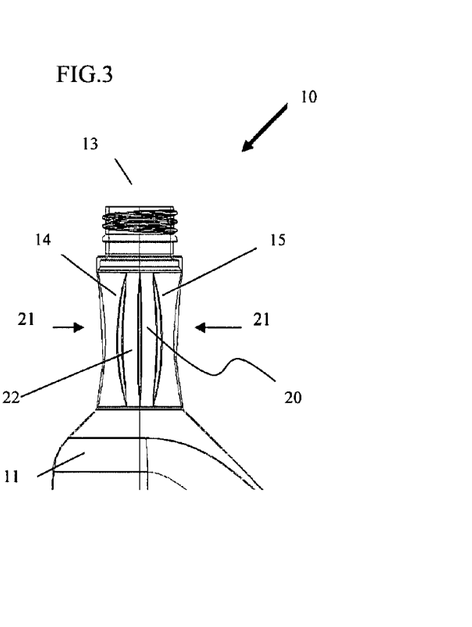
FIG. 3 is a partial profile side view of the Flexible Gate Restrictor shown in FIG. 2 in its open (or static) position.

When membrane 21 of flexible gate restrictor 20 is pushed inward (i.e., an external force is applied) as illustrated in FIG. 3, the inner wall of membrane 21, creates a restricted passageway between entry/exit port 13 and reservoir 11. Specifically, the inner walls of the flexible gate membrane engage each other as folds 14, 15 and folds 16, 17 respectively, are forced together from the external force, thus reducing the diameter of the neck thereby creating a restricted passageway between container reservoir 11 and the entry/exit port 13.

As illustrated in FIGS. 2 and 3, a threaded portion 55 is usually molded into the port 13 so that a cap with a mating threaded portion can be screwed on to the container during shipment.

Container 10 with the flexible gate restrictor 20 remains in the open position during filling, packaging and shipping until the contents of container 10 is ready to be emptied. The cap would be removed and the user would apply inward force on membrane 21, thus reducing the diameter of the neck until the entry/exit port 13 of container 10 is completely closed off—preventing any liquid stored in the reservoir 11 from leaving; once the container safely oriented into the desired position (i.e., inverted), the user releases inward force on membrane 21 and entry/exit port 13 will re-open providing an unobstructed passageway between the reservoir 11 and entry/exit port 13 of container 10. Force may be applied as needed to partially restrict or completely close the flexible gate restrictor 20 in order to control the flow of liquid during the pouring process.

Folds 14, 15, 16, 17 of flexible gate restrictor 20 are designed to provide a spring effect around the pivot points 22. The folds assist in allowing the flexible gate membrane to spring back to its normally open position. A Flexible Gate Restrictor Membrane could be designed without folds 14, 15, 16, and 17 as described in FIG. 5.

Figures 10, 11, 12, 13:
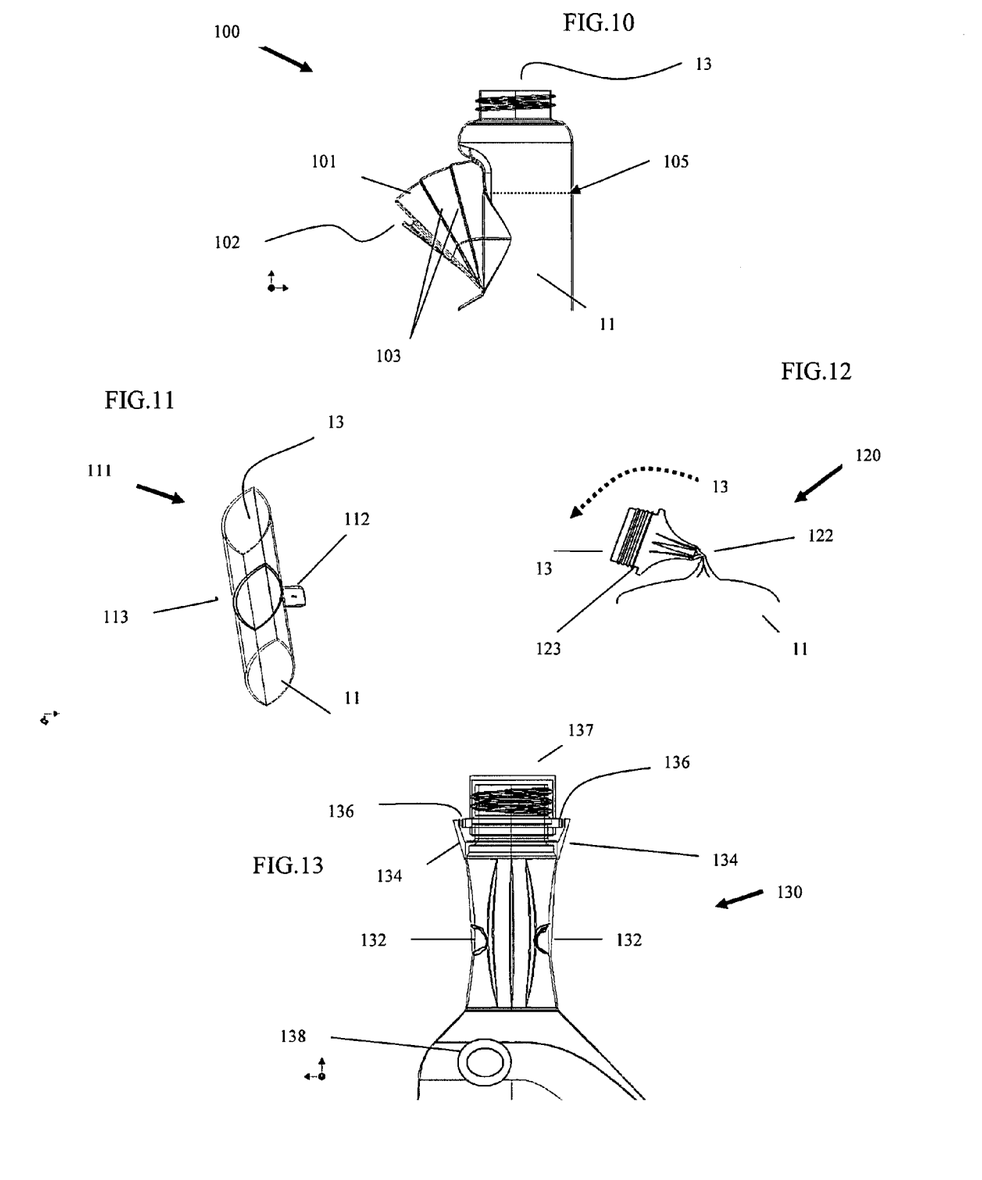
FIG. 10 is a side view of another embodiment of a Flexible Gate Restrictor Membrane in accordance with the present invention; in this particular configuration the Flex Gate Restrictor Membrane has a collapsible feature on one side of the containers neck. This feature includes a series of ribs, bellows or folds similar to an armadillo shell.
FIG. 11 is a side view of another embodiment of a Flexible Gate Restrictor Membrane that is designed to remain open and or closed until a force is applied.
FIG. 12 is a profile side view of the Flexible Gate Restrictor illustrated in FIG. 1 in its closed (or dynamic) position. In this particular view the Flexible Membrane is activated by pushing (bending) the bottleneck to one side. The flexible membrane will close by either squeezing the side walls or by pushing-rotating (bending) the bottleneck (flexible gate membrane).
FIG. 13 is a profile side view of the Flexible Gate Restrictor illustrated in FIG. 1 in its open (or static) position. In this particular design, horizontal control features are included that help control the location of flexing (or bending) and controls the sealing surfaces of the Flexible Gate Membrane. Additionally, there is a feature on the container to snap the closure to the side of the container. This feature would be also be desired on typical water, food and beverage containers.

Referring again to FIG. 2 shows a perspective side view of the Flexible Gate Restrictor which is incorporated into the container shown in FIG. 1. Flexible gate restrictor 20 is shown in the open position. Membrane 21 and vertical folds 14, 15, 16, and 17 in conjunction with pivot points 22 have unique and controlled wall weight distributions/dimensional tolerances that enable the flexible gate restrictor 20 to flex inward when force (i.e., pinching the folds) is applied to the membrane and flex back outward when the inward force is removed. If being used in an oil bottle, the double folds 14, 15, 16 and 17 illustrated in FIGS. 2 and 3 are adequate to control the flow of oil as the bottle is being emptied. However, if an application requires more control or a absolutely complete closure, a horizontal fold may also be incorporated into the flexible gate restrictor 20 as shown in FIG. 13. The addition of a horizontal fold will help control the sealing quality of restrictor membrane 21. The number of both vertical and horizontal folds will determine on the amount of control a user has over the flexible gate restrictor. Additionally, the folds 26 could continue into the body of the container's reservoir to provide increased flexibility to the membrane.

Referring again to FIG. 3, a side view of the normally open (static position) flexible gate restrictor described in FIGS. 1 and 2 is shown. The membrane 21 of flexible gate restrictor 20 does not interfere (in the open position) with the filling of container 10. In the open position there exists an uninterrupted passageway between exit port 13 and reservoir 11. Flexible gate restrictor 20, includes vertical folds 14, 15, (16 and 17 not shown) that will pivot around points 22 when inward pressure is applied to flexible membrane 21.

In the static position entry/exit port 13 remains open. The Flexible gate membrane could be activated by pushing or bending the bottleneck (described in FIG. 12) to close off the entry/exit port 13 of the container by pinching the flexible gate restrictor 20. Once the container is positioned where desired, the force can be released allowing the bottleneck to re-straighten again opening a passage for the fluid.

In the embodiment illustrated in FIGS. 2, 3 and 12, the flow of the fluid may be controlled depending on the amount of force applied to the flexible gate restrictor 20.

Figure 4:
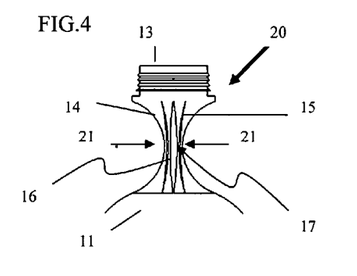
FIG. 4 is a partial profile side view of the Flexible Gate Restrictor shown in FIG. 2 in its closed (or dynamic) position.

Referring now to FIG. 4, the flexible gate restrictor 20 in its closed position is illustrated as force indicated by reference numerals 21 is applied; this is the closed (dynamic position) of the Flexible Gate Restrictor shown in FIG. 1. When membrane 21 of flexible gate restrictor 20 is pushed inward, the inner wall of membrane 21 provides a completely closed or partially restricted (controlled) passageway between entry/exit port 13 and reservoir 11. Specifically, the inner walls of entry/exit port 13 frictionally mate with the inner diameter of membrane 21 and folds 14, 15 (16 and 17 not shown) respectively, thus creating a restricted passageway between container reservoir 11 and the entry/exit port 13. FIGS. 1 through 4 illustrate a bellows type design using folds 14, 15, 16 and 17. However, there are numerous other designs of the flexible gate restrictor that do not require folds 14 through 17—two of which are illustrated in FIGS. 5 and 11.

Figure 5:
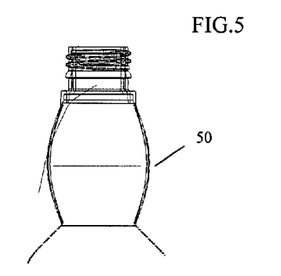
FIG. 5 is a front view of another embodiment of a Flexible Gate Restrictor in accordance with the present invention which could be adapted to a container; this particular design does not include the folds along its vertical.

Referring now to FIG. 5, another embodiment of the Flexible Gate Restrictor Membrane in accordance with the present invention is shown. This particular embodiment does not include the bellows-style folds along its vertical. The sealing surface profile 50 looks similar to the geometry in FIG. 11 without the pull tab. By removing the bellow folds (represented in FIG. 1, by reference numerals 14 through 17) less pressure is required to close off or activate the flexible membrane.

Figure 6:
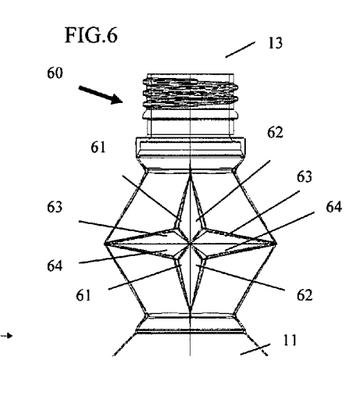
FIG. 6, is a front view of another embodiment of an alternative Flexible Gate Restrictor in accordance with the present invention that may be adapted to a container; this particular construction includes a series of folds (that act as control features) along the vertical and horizontal axis of the Flexible Gate Restrictor.

Referring now to FIG. 6, another embodiment of the Flexible Gate Restrictor 60 in accordance with the present invention is illustrated. This particular embodiment includes a series of folds (control features) along the vertical and horizontal axis of the Flexible Gate Restrictor 60. The flexible gate restrictor 60 has a normally open construction where there is a clear passageway between entry exit port 13 and reservoir 11 when no force is applied to the flexible gate restrictor 60. Flexible gate restrictor 60 includes multiple control surfaces in both the horizontal and vertical directions. Control surfaces 61 and 62 are manufactured in the vertical direction and control surfaces 63 and 64 are manufactured in the horizontal direction.

Figure 7:
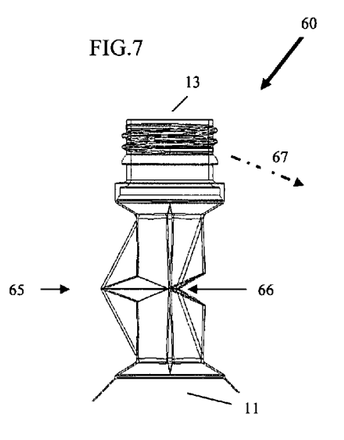
FIG. 7, is a side view of the Flexible Gate Restrictor illustrated in FIG. 6; this particular construction includes a series of folds along the vertical and horizontal axis of the Flexible Gate Restrictor.

In the embodiment illustrated in FIGS. 6 and 7, the star-shaped designed formed by surfaces 61, 62, 63 and 64 protrude from the flexible gate restrictor, while an identically star-shaped design protrudes into the passageway. Now, referring to FIG. 7, applying inward pressure on sides 65, the inner surface represented by reference numeral 66 nests inside the star-shaped surface on side 65, thereby reducing the size of the passageway between entry/exit port 13 and reservoir 11. Accordingly, in the embodiment illustrated in FIG. 7, pressure may be applied by bending or rotating the upper part of the bottleneck in the direction represented by 67, the inner walls of flexible gate 60 will also move together, creating an occluded /controlled passageway between entry/exit port 13 and container/reservoir 11.

Figure 8:
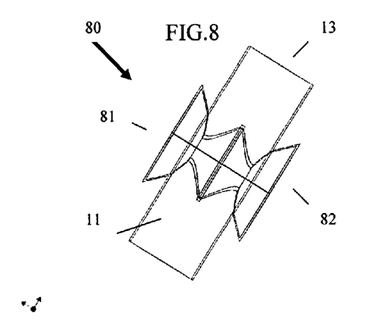
FIG. 8 is a front view of another embodiment of a Flexible Gate Restrictor Membrane; in this particular configuration the Flex Gate Restrictor Membrane incorporates a bellows style membrane.

FIG. 8 is an alternative embodiment of a flexible gate restrictor. Flexible gate membrane 80 includes a bellows-style membrane built into the container's neck. When compressing 81 and 82, the flexible gate restrictor membrane's interior walls collapse upon each other, thus occluding the passageway between reservoir 11 and exit port 13.

Figure 9:
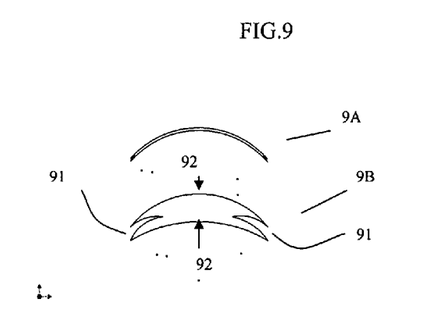
FIG. 9A is a top view of another embodiment of a Flexible Gate Restrictor Membrane in its open (static) position and the closed dynamic position; in this particular configuration the Flex Gate Restrictor Membrane incorporates a bellows style membrane similar to FIG. 1 although in this particular configuration the membrane walls are partially round.
FIG. 9B is a top view of the Flexible Gate Restrictor Membrane illustrated in FIG. 9A in its closed (dynamic) position.

FIG. 9 is a perspective top view of on alternative embodiment of a flexible gate membrane restrictor. FIG. 9B shows the flexible gate restrictor in the open position. FIG. 9A represents the flexible gate restrictor in the closed position. Control features 91 will collapse upon each other when pressure is applied to the opposing sides of the container's flexible gate restrictor. In this particular design, the side walls of the flexible gate restrictor are partially round and include control features 91. Note: A flexible gate restrictor may be designed that does not include control features 91 and or may be designed to include multiple features similar to that of control features 91. There are numerous geometries, shapes (elliptical, round, oval, star) and designs that could be incorporated into the upper portion of a container's neck that will occlude and or control the flow of liquid (or access to the contents of the container) when the restrictor is activated. Depending on the particular design, the restrictor could be activated by bending the container's bottleneck or by squeezing the side walls of the flexible gate restrictor.

Referring now to FIG. 10, another embodiment of a flexible gate restrictor membrane 101 is illustrated. Whereas FIGS. 2 and 3 illustrate an accordion type bellows, FIG. 10 illustrates an armadillo-type bellows 101. In the container system 100 the flexible gate membrane 101 incorporates collapsible control features 103 (feature includes a series of ribs, bellows or folds similar to an armadillo shell) and may incorporate push/pull tab 102. Container system 100 will be manufactured in the normally open position, as represented in FIG. 10. To activate flexible gate membrane 101, a user would push inward on push/pull tab 102. Thereby collapsing the bellows/ribs 103 upon each other thus, eventually closing off the container's passageway between entry/exit port 13 and containers reservoir 11. An interior sealing surface 105 would be created when flexible gate membrane 101 is pushed completely inward. In this particular design, push/pull tab 102 can be retracted, when the container is located in its desired position. Container system 100 could be used for numerous applications, including lyophilization containers, baby bottles, specialized applicators or beverage containers. These alternative applications will be discussed later in FIGS. 14 and 15.

FIG. 11 is another alternative configuration where the Flexible Gate Restrictor Membrane may be designed to remain normally open or normally closed (depending on the application) until a force is applied. In this particular design, flexible gate membrane 111 has a cross-sectional oval or saucer shape 113. The oval/saucer shape is also represented in FIG. 5 (at its sealing surface). Flexible gate restrictor 111 may also incorporate a push/pull tab 112. Push/pull tab 112 may or may not be necessary depending on the desired function. If flexible gate restrictor 111 is normally open, then there is no need for push pull tab 112. If the flexible gate restrictor 111 is normally closed, push/pull tab 112 may be needed so that a user may grab the flexible gate restrictor in order to open the passageway.

In order to activate the container's flexible gate restrictor, one would simply squeeze both sides of the flexible gate restrictor together (closing the passageway). When releasing the pressure to flexible gate restrictor, the passageway will re-open providing a clear passageway between entry/exit port 13, and the containers reservoir 11. Note: unlike the flexible gate restrictor previously described in FIG. 1 and in FIG. 9, the flexible gate restrictor 111 does not include control features 14, 15, 16, 17 and 91, respectively, which collapse upon themselves when the flexible gate restrictor is activated. Flexible gate restrictor may also include (if desired) horizontal features 132, which are later described in FIG. 13.

Referring now to FIG. 12, the flexible gate restrictor 120 is shown in the closed off (activated) position. Flexible gate restrictor 120 interior side walls, 122 are forced to gather when the bottleneck 123, is bent (illustrated by 121) relative to the containers reservoir. Flexible gate restrictor 120 illustrates one example of numerous geometries that may be incorporated to restrict the flow of fluid between entry exit port 13, and the containers reservoir is 11.

As previously described in FIGS. 1 through 4 and FIGS. 6, 7 and 11, the flexible gate membrane may be activated by either applying inward force (squeezing) or by bending the bottleneck (represented by number 121). In both cases, the side walls of the flexible gate membrane 122 will close off the passageway between the entry/exit port and the container's reservoir. Once the container is oriented into the desired position, the user may release the pressure on the side walls of the flexible membrane or remove the pressure on the bottleneck, causing the flexible gate membrane to return to its static position (open) thus, creating a non-interrupted passageway between entry/exit port 13 and container's reservoir 11.

FIG. 13 is a profile side view of a normally open (static position) flexible gate restrictor 130. In this particular design, horizontal control features 132 are included that help control the location of flexing (or bending) and controls the sealing surfaces of the Flexible Gate Membrane. The control features 132 are cut-outs or other reduction of material that are used when the top of the flexible gate restrictor is bent to control flow instead of using direct external force (or squeezing).

As previously described, once the flexible gate restrictor is activated, the interior side walls of the flexible gate membrane 130 will close off the passageway between the entry/exit port 13 of the container and the container's reservoir. Once the container is oriented into the desired position, the user may release the pressure on the side walls of the flexible membrane (or release the pressure on the bottleneck) causing the flexible gate membrane to return to its static position (open) thus, creating a non-interrupted passageway between the container's entry/exit port and the container's reservoir.

Continuing to refer to FIG. 13, a closure holding feature 138 on the container to hold the cap or closure to the side of the container is illustrated. This closure holding feature 138 may also be a desired feature on typical water, food and beverage containers. For example; after removing the closure on a typical water bottle it is very common to misplace it. By incorporating the closure holding feature 138 into existing containers the closure may be snapped directly onto the side of the container until it is needed.

FIG. 13 also illustrates a child resistant cap. Flexible arms 134 engage mating features 136 on the perimeter of the cap 137. More specifically, after closure 137 is placed on the container the locking mechanism features 136 of the closure communicate with container features 134. When closure 137 is securely placed onto the container, the locking features 134 and 136 engage thus, preventing rotation of closure 137. In order to remove closure 137, the flexible gate restrictor 132 needs to be activated as previously described (by squeezing the side walls of the flexible gate restrictor membrane, 132). The inward pressure on flexible gate restrictor membrane 132 causes the locking arms 134 of the container to move outward thereby, disengaging locking features 136 of the closure, thus, allowing closure 137 to be rotated or unscrewed.

Figure 14:
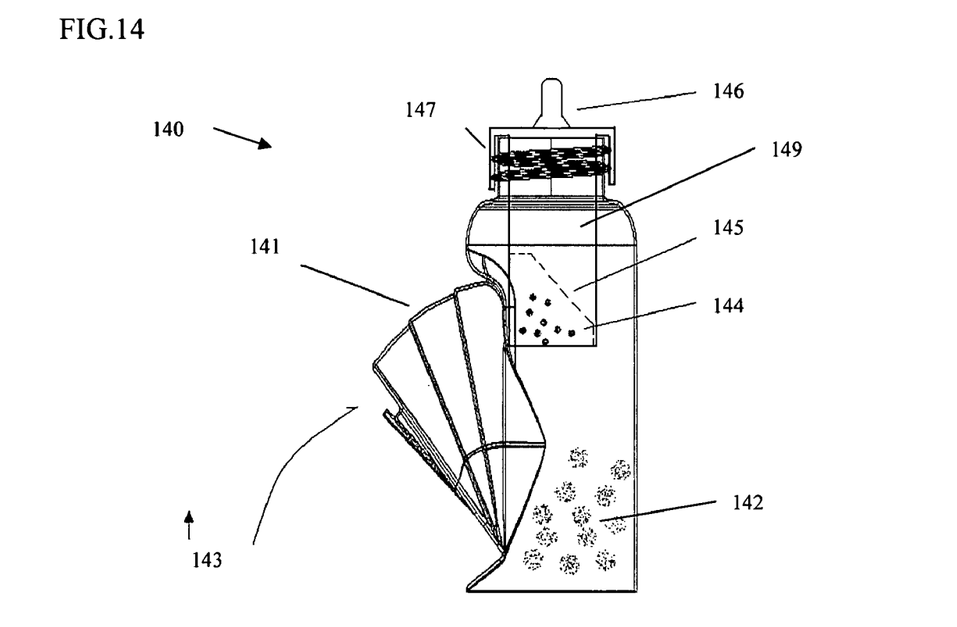
FIG. 14 is another embodiment of the Flexible Gate Restrictor Membrane adapted to a container that communicates with a specialized closure (i.e., cap) system. In this particular example, a Lyophization Baby Bottle is shown. The Flex Gate Restrictor Membrane has a collapsible feature on at least one side of the bottle's neck. This feature includes a series of ribs, bellows or folds (control features) similar to an armadillo shell. The collapsible feature of the container will open a seal (or break) on a specialized closure, thus mixing the sealed contents of the closure with the contents of the container and simultaneously, opens a passageway to the exit port of the container.

FIG. 14 is another embodiment of a Flexible Gate Restrictor Membrane adapted to a container that communicates with a specialized closure system. In this particular example, a Lyophization Baby Bottle 140 is shown. The Flex Gate Restrictor Membrane (not to scale) has collapsible features 141 on at least one side of the container. These features include a series of ribs, bellows or folds (control features) similar to an armadillo shell. Lyophization Baby Bottle 140 includes closure 147. Closure 147 includes baby bottle nipple 146 and closure reservoir 149.

It should be noted that the flexible gate restrictor shown in FIG. 14 is only one example of a flexible gate membrane that may communicate with the specialized closure system described in this application. In addition to the flexible gate membrane designs, described throughout this application, numerous other designs could be adapted to communicate with a specialized closure system described in FIGS. 14, 15 and 16.

In the embodiment shown in FIG. 14, baby bottle 140 is filled with water (represented by 142) and closure 147 is placed onto the container's exit port. During the manufacturing process, closures reservoir 149 is filled with the nutrient 144 in this particular case, a baby formula. Closure 147 also includes a breaking parting line 145 that is designed to snap or open when pressure is applied by the flexible membrane of the container. When activating baby bottle 140 the collapsible feature 141 of the container will engage (open/break) the closures parting line/seal 145 thus, mixing the sealed contents 144 of the closure with the contents 142 of the container and simultaneously opening a passageway to the exit port (in this case nipple 146) of the container 140.

Figure 15:
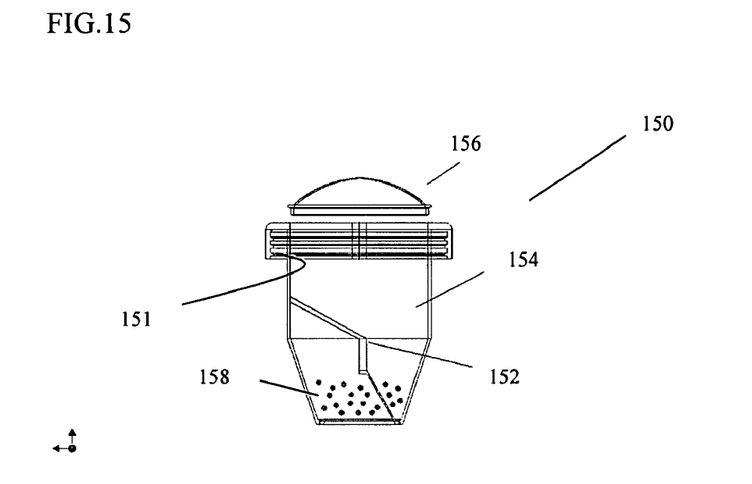
FIG. 15 is a side view of a specialized closure that incorporates a sealed reservoir. This particular closure system could be used for a lypholization container or a specialized applicator system. The closure system is designed to work in conjunction with a flexible gate membrane.

FIG. 15 is a side view of a specialized closure that incorporates a sealed reservoir. This particular closure system could be used for lypholization containers or specialized applicator systems. The closure system is designed to communicate with the flexible gate membranes of containers, which include the flexible gate restrictor technology described throughout this application.

Specifically, as previously described in FIG. 14, closure system 150 would be applied (threaded closure 151) to a container after the container is filled. Closure system 150 may include either a baby nipple 146 or a top cover 156 depending on the specific application. For example; if the container is designed to be used for a beverage drink (where the closure would be unscrewed (removed) after mixing of the contents, then flexible top cover 156 could be adapted to the closure 150 after the closure reservoir 154 is filled.

As will be evident to one skilled in the art, after a thorough reading of the present disclosure, numerous designs of top cover could be adapted depending on the application, such as a sport drink top.

Closure 150 includes a breaking/parting line 152 that is designed to snap or break open when pressure is applied by the flexible membrane of the container. For example, when activating the container/closure system (Lyophilization container), the collapsible features (described in FIGS. 1 through 15) of the container will communicate-engage (open/break) the closures parting line/seal 152 thus, opening the closures reservoir 154 allowing the mixing of the sealed contents 158 of the closure 150 with the contents of the container.

Figure 16:
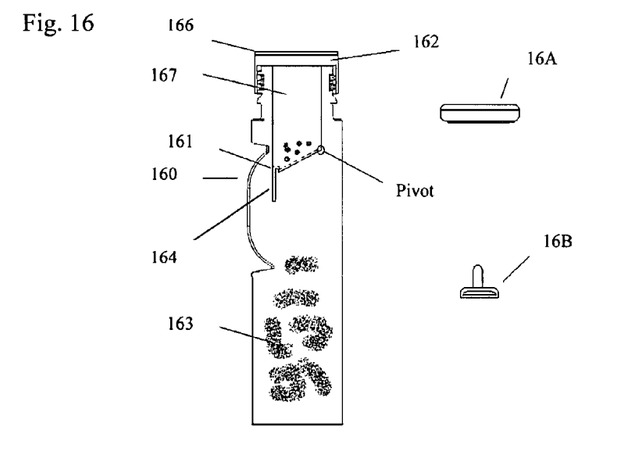

Some examples of these closure systems are described in FIGS. 14, 15 and 16. The specialized closures are designed to open the passage way between the exit port of the container and the reservoir of the container. The closure systems may also include their own reservoirs to include lyophilization capabilities as well as a gate mechanism; these will include applications such as applicators, baby bottles and numerous other applications where contents maybe separated during manufacturing and mixed prior to use). Also, the flexible gate membrane could be used to replace the standard closure of many containers and or replace the tamper evident features on closures. For example, until the parting line seal 152 of the closure is broken (See FIG. 15), access to the contents of the container would be prohibited. It is important to note that a key element with these specialized closures (inserts) is that they communicate with the container's interior side walls as the container is squeezed inward.

Even though specific flexible gate membranes are described and disclosed herein, it would be possible to utilize these specialized closure systems with any existing container that is malleable or flexible enough to communicate with the described closure technology. The limiting factor would be that the range of inward motion needed to activate the flexible gate mechanism must also be able to break the parting line seal.

Referring now to FIG. 16, an alternative embodiment of the flexible gate restrictor membrane adapted to a container that communicates with a specialized closure system is illustrated. In this particular embodiment, a lyophization beverage or applicator is shown. The flex gate restrictor membrane has a collapsible feature 160 on at least one side of the container. The collapsible feature of the container will open seal 161 (or break) on closure 162, thus mixing the sealed contents within reservoir 167 of the closure, with the contents of the container 163 and simultaneously, opening a passageway to the exit port of the container. This particular closure has a lever arm 164 that is designed to communicate with the collapsible feature 160 of a container. Note: In this example top cover 166 is for a removable beverage container closure, although different top covers 16A and 16B could be adapted such as an applicator head or baby bottle nipple, respectively (or sport top to name a few).

Figure 17:
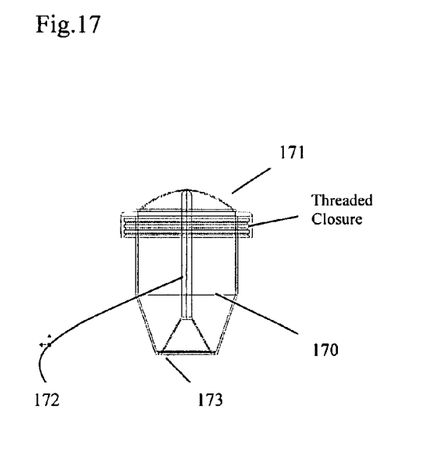
FIG. 17 is a side view of a specialized closure that incorporates a sealed reservoir. This particular closure system could be used for a lypholization container or a specialized applicator system. The closure system is designed to communicate with a flexible top cover membrane instead of a flexible container's sidewall. This particular example would not require a special container.

Referring now to FIG. 17, a side view of a specialized closure that incorporates a sealed reservoir 170 is shown. This particular closure system could be used for a lypholization container or a specialized applicator system. The closure system is designed to communicate with a flexible top cover membrane (previously described in U.S. patent application Ser. No. 10/985,852 filed Nov. 10, 2004, titled CLOSURE ASSEMBLY in the name of Kenneth A. Alley) referring to a pump or valve that may be adapted to the Flex Closure 171 instead of a flexible container's sidewall. This particular example would not require a special container. When flexible top cover membrane 171 is pushed downward, shaft 172 forces breakaway seal 173 open, thus creating a passageway between reservoir 170 and any container the closure is screwed onto.

U.S. application Ser. No. 10/985,852 filed Nov. 10, 2004, is hereby incorporated by reference as if fully set forth herein.

Figure 18:
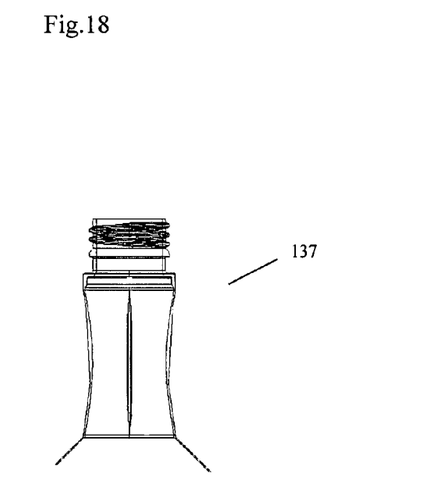
Figure 18A:
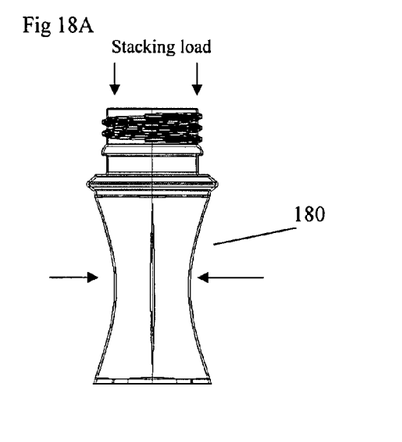

FIG. 18 is a side view of the Flexible Gate Restrictor 50 (shown in FIG. 5) which could be adapted to a container. This particular design does not include the folds along its vertical. Referring to FIG. 18a represents a perspective side view of the flexible gate restrictor 180. The Flexible membrane 180 has a unique shape to provide both; the means to flex inward under pressure and maintain its memory once the pressure is released and to provide a substantial stacking load, thus when a downward pressure is placed on the top of the finish/bottleneck, the membrane 180 will maintain its structural integrity due to the structural geometry of the flexible gate membrane 180.

FIG. 18B is a perspective side view at a 90 degree angle from FIG. 18A. The flexible gate membrane 180 has a geometry that provides the means to collapse upon itself when membrane 180 is compressed or flexed inward. The geometry provides the means to close off the entry/exit port of the container without destroying the structural integrity of a rigid (typically HDPE plastic) container. Typically, the process to manufacture an oil container is the extrusion blow molding process. The material that is commonly used is high density polyethylene. These materials are usually rigid in order to provide strength and support to withstand the life cycle of the product thus, manufacturing, filling, distribution, shelving, etc.

A typical container (example oil) has a very rigid entry exit port. If a sharp impact were to hit the entry/exit port section it would be likely that the container's structural integrity would be damaged thus causing it to leak. The flexible gate membrane 180 (by use of geometry) in each of the embodiments described throughout the entire application provides the means to control the rigid material, thus providing means to flex, bend, or squeeze the rigid material without destroying the container's entry/exit port structural integrity.

FIG. 18C represents a perspective side view of flexible gate membrane 180 in a partially closed off position. The membrane 180 has been pushed or bent towards the horizontal partially closing off the entry exit port of a container. The interior wall of membrane 180 will compress together at cross section reference point 200 thus, sealing the contents of the container until the pressure is released. By incorporating unique geometry into the flexible gate membrane 180 the container's entry/exit port will automatically re-open when the pressure is released providing a reusable feature that will not destroy the container's integrity unlike a typical container.

A relatively small bellows feature 185 may be included in the container to improve the container's function. For example, when the flexible gate membrane is bent as in FIG. 18C the bellows feature 185 will be stretched providing extra material on the (section a) side and (section b) side will be compressed. The addition of feature 185 should enhance the geometry to control the flexible gate membrane although it is not required.

FIG. 18D represents an illustration how a user could activate the flexible gate restrictor described in FIGS. 18A-E. The user could activate the flexible gate membrane by either squeezing or bending the membrane. The user would then invert the container and place the entry/exit port into the receiving reservoir and then release the pressure on the membrane. The membrane would automatically re-open (by its geometry) causing a non-interrupted flow of liquid until the membrane is re-closed or until the contents are emptied. For example, the flexible gate membrane technology will allow a user to pour the oil out of an oil container into the automobile/boat etc, without the use of a funnel.

Most importantly, the flexible gate membrane would not add cost to the container, it could be manufactured using the exiting extrusion blow molding technology and would utilize the existing infrastructure to produce. Its one piece design makes it an economically viable option to produce for the purpose of large volume consumer packaging. The other major benefits are that it is an environmentally conscience container that will help eliminate spillage of potentially hazardous materials such as motor oils and other chemicals/lubricants. The adaptation of a flexible gate membrane also eliminates the need to contaminate a funnel. FIG. 18E represents a top view of the flexible gate membrane. A unique feature and benefit of this particular configuration is that the cross section of the sealing surface provides a substantial increase in air to liquid (oil) displacement, compared to existing containers with a straight cylindrical neck of typical containers. The flexible gate membranes geometry in this configuration decreases the time required to empty the contents of a regular 1 quart container of oil by approximately 25-30% and most importantly by increasing the air to oil displacement the gargling effect is also minimized thus improving the safety of the container when its contents are poured with or without utilizing the flexible gate membrane.

It should be noted that there is a greater surface area at the sealing surface cross-section than there is at the at the top of the entry/exit port. The air to liquid displacement is improved from that of a regular cylindrical container neck because there is increased surface area for the air to flow around the liquid stream. Additionally, the unique geometry can be blow molded when the container itself is blow molded thus adding no extra cost but providing additional value and function. The container can also be filled in its static blown/open position.

The flexible gate membrane could be adapted to a wide variety of containers, such as containers for anti-freeze, coolants, lubricants, multi-quart oil containers, additives, chemicals, marine additives, food and beverages, etc. Wherever there may be a need previously, to use a funnel (or to help control) to aid in pouring, the Flexible gate membrane has a purpose thus, controlling the precise pouring of a container's content without the use for a funnel. There are substantial commercial benefits both; economical and environmental to incorporate the flexible gate membrane for use with automotive and marine (lubricant oils). The flexible gate membrane in accordance with the present invention eliminates spillage and prevent the need to contaminate a funnel, providing the uses of these hazards materials both; better safety and convenience. It is important to understand that there are numerous shapes, designs and/or features that could be adapted or incorporated to a container to provide a flexible gate membrane. The purpose of the particular embodiments described is to incorporate a simple, economical, single piece representation of the described technology, but not to limit the possibilities of alternative geometries that would control the typically rigid material of a container and provide a flexible gate without destroying the container's structural integrity.

Although this invention has been described and illustrated by reference to specific embodiments, it will be apparent to those skilled in the art that various changes, modifications and equivalents may be made which clearly fall within the scope of this invention. The present invention is intended to be protected broadly within the spirit and scope of the appended claims.

I claim:

1. A valve for use with a container and cap combination, the container having an outlet, the outlet including elongated sidewalls that extend from the container that form a passageway through which product passes when the container is being filled or emptied, the outlet having a mouth on the end opposite the point the sidewalls extend from the container, wherein a portion of the sidewalls proximate the mouth is threaded, the cap having mating threads on its interior surface removably securing said cap to the threaded sidewalls for closing the passageway, said valve comprising:

a flexible, accordion-type bellows restrictor integrated into the sidewalls, said bellows restrictor being movable so that when an external force is applied to the sidewalls space between the bellows is reduced thereby closing the passageway to prevent product from leaving the container, and when the force is removed space is created between the bellows thereby opening the passageway, allowing product to enter or exit the container; and at least one pair of arms that can lockingly engage the cap, said at least one pair of arms communicating with the movement of the bellows so that the arms simultaneously disengage the cap when the external force is applied to the bellows.

2. The valve of claim 1 further comprising a tab attached to said flexible restrictor that facilitates the operation of said restrictor.

3. The valve of claim 1 further comprising a tamper evident means by ultrasonically sealing said bellows together to close off the passageway during its manufacturing process.

4. A dual-compartment container comprising:

a first storage compartment having a closed end and an open end;

a second storage compartment having a closed end and an open end, said second storage compartment being placed inside the first compartment closer to the open end of the first compartment and sealing off the open end of the first compartment, said second storage compartment having a parting line seal that breaks open under pressure;

a bellows-type restrictor having a plurality of pleated folds, said restrictor placed near the sealed-off open end of the first storage compartment proximate the second storage compartment such that when an external force is applied to the bellows-type restrictor, sufficient pressure is simultaneously applied to the parting line seal so that said seal breaks, thereby forming a passageway between the first storage compartment and the second compartment.

5. The dual-compartment container of claim 4 wherein the open end of the second storage compartment has threads on its outer surface, and further comprising a cap having mating threads thereby allowing said cap to screw onto said open end of the second storage compartment.

* * * * *